US012565195B2

(12) United States Patent
El Dana et al.

(10) Patent No.: US 12,565,195 B2
(45) Date of Patent: Mar. 3, 2026

(54) METHOD AND APPARATUS FOR RECORDING A TRAVEL TRAJECTORY FOR A PARKING MANEUVER

(71) Applicant: Bayerische Motoren Werke Aktiengesellschaft, Munich (DE)

(72) Inventors: Mohamad Mounir El Dana, Munich (DE); Rebecca Pascal, Munich (DE); Daniel Telschow, Munich (DE); Benjamin Krimmer, Munich (DE); Benedikt Hoffmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 174 days.

(21) Appl. No.: 18/411,149

(22) Filed: Jan. 12, 2024

(65) Prior Publication Data

US 2024/0239332 A1     Jul. 18, 2024

(30) Foreign Application Priority Data

Jan. 13, 2023    (DE) ..................... 10 2023 100 741.6

(51) Int. Cl.
| | |
|---|---|
| *B60W 30/06* | (2006.01) |
| *B60W 50/14* | (2020.01) |
| *B60W 60/00* | (2020.01) |

(52) U.S. Cl.
CPC ............ *B60W 30/06* (2013.01); *B60W 50/14* (2013.01); *B60W 60/001* (2020.02); *B60W 2520/06* (2013.01)

(58) Field of Classification Search
CPC .... B60W 30/06; B60W 50/14; B60W 60/001; B60W 2520/06; B60W 2050/146; B60W 2420/54; B60W 2520/10
See application file for complete search history.

(56) References Cited

U.S. PATENT DOCUMENTS

| | | | |
|---|---|---|---|
| 2012/0089294 A1* | 4/2012 | Fehse ..................... G08G 1/168 701/25 |
| 2022/0274588 A1* | 9/2022 | Marek ................... B60W 30/06 |

FOREIGN PATENT DOCUMENTS

| | | | |
|---|---|---|---|
| DE | 10 2021 204 723 A1 | 11/2022 | |
| DE | 10 2021 130 169 A1 | 5/2023 | |
| WO | WO-2017122718 A1 * | 7/2017 ............. B60R 21/00 |

OTHER PUBLICATIONS

WO2017122718A1—English Trans (Year: 2017).*

(Continued)

*Primary Examiner* — Abby Lin
*Assistant Examiner* — Renee LaRose
(74) *Attorney, Agent, or Firm* — Crowell & Moring LLP

(57) ABSTRACT
An apparatus for recording a travel trajectory for a parking maneuver by a vehicle is disclosed. The apparatus is configured to record, during a travel of the vehicle, a first section of the travel trajectory, in which the longitudinal and/or the lateral guidance of the vehicle is effected manually by the driver of the vehicle. The apparatus is furthermore configured to recognize, during the travel of the vehicle, that an automatic parking maneuver needs to be performed, and to record, during the performance of the automatic parking maneuver as a continuation of the travel of the vehicle, a second section of the travel trajectory, in which the longitudinal and/or the lateral guidance is effected in an automated manner by the vehicle.

10 Claims, 2 Drawing Sheets

(56)                          References Cited

OTHER PUBLICATIONS

German-language Search Report issued in German Application No. 10 2023 100 741.6 dated Oct. 13, 2023 with partial English translation (11 pages).

* cited by examiner

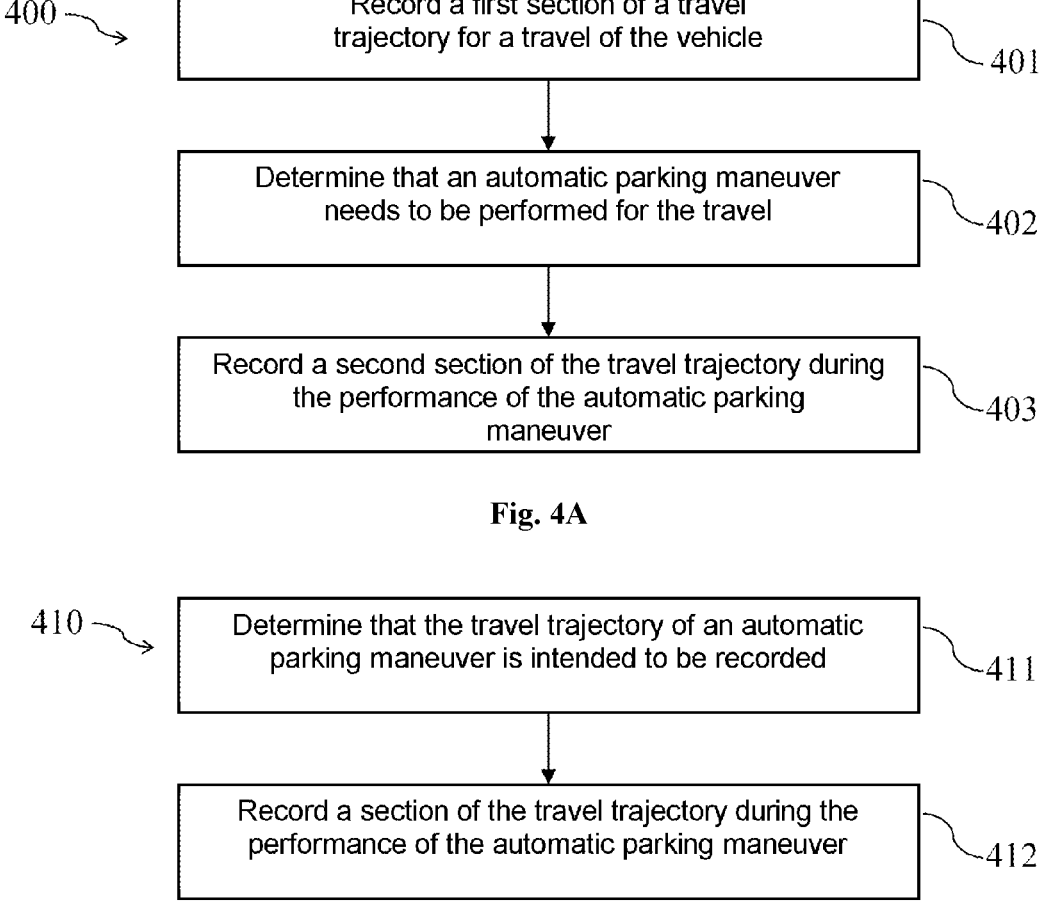

400

Record a first section of a travel
trajectory for a travel of the vehicle          401

Determine that an automatic parking maneuver
needs to be performed for the travel          402

Record a second section of the travel trajectory during
the performance of the automatic parking
maneuver          403

Determine that the travel trajectory of an automatic
parking maneuver is intended to be recorded          411

Record a section of the travel trajectory during the
performance of the automatic parking maneuver          412

Fig. 4B

METHOD AND APPARATUS FOR RECORDING A TRAVEL TRAJECTORY FOR A PARKING MANEUVER

CROSS REFERENCE TO RELATED APPLICATION

This application claims priority under 35 U.S.C. § 119 from German Patent Application No. 10 2023 100 741.6, filed Jan. 13, 2023, the entire disclosure of which is herein expressly incorporated by reference.

BACKGROUND AND SUMMARY

The invention relates to a method and a corresponding apparatus that are geared to assist the user of a vehicle in recording a travel trajectory for the repeat performance of driving maneuvers, in particular parking maneuvers.

A vehicle may have an assistance function that allows the user of the vehicle to record and store a travel trajectory traveled along during the manual driving operation. The travel trajectory may relate to a parking maneuver by the vehicle into or out of a parking space. The stored travel trajectory may be used at a later time to take the vehicle along the stored travel trajectory in an automated manner. This allows the convenience of the vehicle to be increased in respect of the repeat performance of driving maneuvers, in particular parking maneuvers.

The vehicle may furthermore have a park assistance function that may assist the user of the vehicle in parking in or leaving a parking space. The assistance function may in particular be designed to perform an automatic parking maneuver in which the lateral guidance of the vehicle and possibly also the longitudinal guidance of the vehicle are effected in an automated manner by the vehicle.

The present document is concerned with the technical object of increasing convenience for a vehicle user when recording and/or storing a travel trajectory for a parking maneuver.

The object is achieved by each of the independent claims. Advantageous embodiments are described, among other things, in the dependent claims. It is pointed out that additional features of a patent claim that is dependent on an independent patent claim may without the features of the independent patent claim or only in combination with a subset of the features of the independent patent claim, form a separate invention that is independent of the combination of all the features of the independent patent claim and that can be turned into the subject matter of an independent claim, a divisional application or a subsequent application. This applies in the same way to technical teachings described in the description, which are able to form an invention that is independent of the features of the independent patent claims.

According to one aspect, an apparatus for recording a travel trajectory for a parking maneuver by a (motor) vehicle is described. The recording of the travel trajectory may involve trajectory data being captured and recorded. For each of a multiplicity of points and/or positions along the travel trajectory, the trajectory data may indicate:
- the coordinates of the respective position;
- the orientation and/or alignment of the vehicle at the respective position; and/or
- the speed of travel of the vehicle at the respective position.

The trajectory data concerning the travel trajectory may be stored in a storage unit of the vehicle. Furthermore, the trajectory data may be used in a replay mode to take the vehicle along the travel trajectory (from the starting position to the final position in the travel trajectory) in an automated manner (with automated longitudinal and/or lateral guidance).

The apparatus is configured to record, during a travel of the vehicle, a first section of the travel trajectory. The first section of the travel trajectory may involve here the longitudinal and/or the lateral guidance of the vehicle being effected manually by the driver of the vehicle. The recording of the first section of the travel trajectory may be started in response to a user input on the user interface of the vehicle.

The apparatus is furthermore configured to recognize, during the travel of the vehicle, that an automatic parking maneuver needs to be performed. The apparatus may be configured to use, during the travel of the vehicle (and during the recording of the first section of the travel trajectory), the user interface of the vehicle to output an offer to perform the automatic parking maneuver. It is then possible to respond to a user input in relation to the offer by recognizing that the automatic parking maneuver needs to be performed.

The apparatus may in particular be configured to detect a parking space for the vehicle during the travel of the vehicle (and during the recording of the first section of the travel trajectory). The parking space may be recognized on the basis of environmental data from one or more environment sensors (e.g. from one or more cameras) of the vehicle. In response to the detected parking space, the user interface of the vehicle may be used to output an offer to perform an automatic parking maneuver onto or into the detected parking space (the offer being able to be accepted by the driver of the vehicle by way of a user input).

In addition, the apparatus is configured to record, during the performance of the automatic parking maneuver as a continuation of the travel of the vehicle, a second section of the travel trajectory. The second section may involve the longitudinal and/or the lateral guidance being effected in an automated manner by the vehicle. In particular, at least the lateral guidance of the vehicle may be effected in an automated manner (whereas the longitudinal guidance is optionally effected by the driver).

The apparatus may be configured to recognize, at an intermediate position on the travel trajectory, that an automatic parking maneuver needs to be performed. The first section of the travel trajectory may then be recorded up to the intermediate position and the second section of the travel trajectory may be recorded (directly afterwards) from the intermediate position.

The apparatus may furthermore be configured to end the recording of the second section of the travel trajectory in response to a user input on the user interface of the vehicle and/or automatically when the final position in the automatic parking maneuver is reached.

At the final position in the travel of the vehicle (which may correspond to the final position in the automatic parking maneuver), the user interface of the vehicle may be used to output an offer to store the travel trajectory. It is then possible to have the travel trajectory stored in the storage unit of the vehicle (and able to be provided for a subsequent replay) in response to a user input in relation to the offer.

An apparatus for a driver assistance function is therefore described that facilitates the recording of a combined travel trajectory into which not only a manual travel but also an automatic parking maneuver may be integrated. Particularly convenient repeat performance of parking maneuvers may thus be facilitated. The parking maneuver described by the travel trajectory may comprise here at least one (first) section that goes beyond the automated parking maneuver.

The apparatus may be configured to store the recorded travel trajectory for a subsequent use, when the parking maneuver is repeated, such that the stored travel trajectory comprises a steady and/or smooth transition at the intermediate position (between the first section and the second section). Alternatively or additionally, the stored travel trajectory may be in a form such that the stored travel trajectory does not comprise a standstill by the vehicle at the intermediate position (between the first section and the second section) (even if the vehicle is stationary at the intermediate position for the recording, which may be effected e.g. as a result of the selection of the automatic parking maneuver by the driver). Alternatively or additionally, the stored travel trajectory may be in a form such that the stored travel trajectory is continuous and/or uninterrupted from the starting position at the start of the first section (through the intermediate position) to the final position at the end of the second section.

The apparatus may in particular be configured to recognize that, at the intermediate position (between the first section and the second section of the travel trajectory), the travel of the vehicle has an intermediate phase in which the speed of travel of the vehicle is the same as or below a speed threshold value, in particular zero. The intermediate phase may have a specific duration. The intermediate phase may be caused e.g. by the driver selecting the offer to perform an automatic parking maneuver at the intermediate position.

The apparatus may be configured to shorten the timing (compared with the specific duration) of, in particular to eliminate, the intermediate phase within the travel trajectory to store the travel trajectory. This allows a particularly convenient travel trajectory to be provided for a subsequent replay.

In addition, the apparatus may be configured to use, in a replay mode, the user interface of the vehicle to output an offer to use the recorded travel trajectory stored in the storage unit of the vehicle for a repeat performance of the parking maneuver. By way of example, the vehicle may be recognized to be approaching the starting position in the stored travel trajectory. In response thereto, the offer to replay the travel trajectory may be output. Furthermore, in response to a user input in relation to the offer, it is possible to have the parking maneuver performed (from the starting position through the intermediate position to the final position) in an automated manner on the basis of the travel trajectory. This allows a particularly convenient repeat performance of the parking maneuver to be effected.

According to another aspect, a further apparatus for recording a travel trajectory for a parking maneuver of a (motor) vehicle is described. The measures and/or features described in this document are also applicable individually or in combination for this apparatus.

The apparatus is configured to recognize, during the performance of an automatic parking maneuver (in which the vehicle is longitudinally and/or laterally guided in an automated manner), that the travel trajectory effected during the parking maneuver needs to be recorded. As already explained earlier, a parking space for the vehicle may have been recognized (e.g. on the basis of the environmental data). Furthermore, an offer to perform an automatic parking maneuver for the parking space may have been output (e.g. to leave the parking space). The offer may have been accepted by the driver of the vehicle, whereupon the performance of the automatic parking maneuver has been initiated.

The apparatus may be configured to detect (during the performance of the automatic parking maneuver) a user input on the user interface of the vehicle (which is aimed at starting the recording of the travel trajectory). On the basis of the user input, it is then possible to recognize that the travel trajectory needs to be recorded.

The apparatus is furthermore configured to respond to the recognition by having the travel trajectory recorded (during the performance of the automatic parking maneuver). Furthermore, the travel trajectory may be stored in the storage unit of the vehicle for a later replay (e.g. in response to a further user input from the user).

The apparatus may in particular be configured to take the vehicle up to an intermediate position (which corresponds e.g. to the final position in the automatic parking maneuver) when the automatic parking maneuver is being performed. It is possible to detect at the intermediate position that the travel of the vehicle from the intermediate position is being continued manually by the driver of the vehicle (and that the recording of the travel trajectory has not been finished by a user input). It is then possible to have the recording of the travel trajectory continued as the vehicle travels from the intermediate position. The recording may continue such that the travel trajectory comprises a section for the automatic parking maneuver and a subsequent section for the travel from the intermediate position. Furthermore, it is possible to have the stored travel trajectory optimized (at the intermediate position) described in this document, e.g. in order to shorten the timing of or completely eliminate the intermediate phase at the intermediate position.

An apparatus for a driver assistance function is therefore described that facilitates the recording of a travel trajectory that has been effected for an automatic parking maneuver. In addition, one or more sections of a manual travel may also be integrated into the travel trajectory. This allows particularly convenient repeat performance of parking maneuvers to be facilitated.

According to another aspect, a (road) motor vehicle (in particular an automobile or a truck or a bus or a motorcycle) is described that comprises one or more of the apparatuses described in this document.

According to another aspect, a method for recording a travel trajectory for a parking maneuver by a (motor) vehicle is described. The method comprises recording, during a travel of the vehicle, a first section of the travel trajectory, in which the longitudinal and/or the lateral guidance of the vehicle is optionally effected manually by the driver of the vehicle. The method furthermore comprises recognizing, during the travel of the vehicle, that an automatic parking maneuver needs to be performed (by the park assist system of the vehicle). In addition, the method comprises recording, during the performance of the automatic parking maneuver as a continuation of the travel of the vehicle, a second section of the travel trajectory, in which the longitudinal and/or the lateral guidance is effected in an automated manner by the vehicle.

According to another aspect, a further method for recording a travel trajectory for a parking maneuver by a (motor) vehicle is described. The method comprises recognizing, during the performance of an automatic parking maneuver (in which the vehicle is longitudinally and/or laterally guided in an automated manner) that the travel trajectory effected during the parking maneuver needs to be recorded. The method furthermore comprises responding to the recognition by having the travel trajectory recorded.

According to another aspect, a software (SW) program is described. The SW program may be configured to be executed on a processor (e.g. on a control unit of a vehicle) and to thereby carry out one or more of the methods described in this document.

According to another aspect, a storage medium is described. The storage medium may comprise a SW program configured to be executed on a processor and to thereby carry out one or more of the methods described in this document.

It should be noted that the methods, apparatuses and systems described in this document may be used either alone or in combination with other methods, apparatuses and systems described in this document. In addition, any aspects of the methods, apparatuses and systems described in this document may be combined with one another in a wide variety of ways. In particular, the features of the claims may be combined with one another in a wide variety of ways. Furthermore, features between parentheses should be understood to be optional features.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 4A and 4B each show a flowchart for an illustrative method for recording a travel trajectory for a parking maneuver.

DETAILED DESCRIPTION OF THE DRAWINGS

Figure 1:
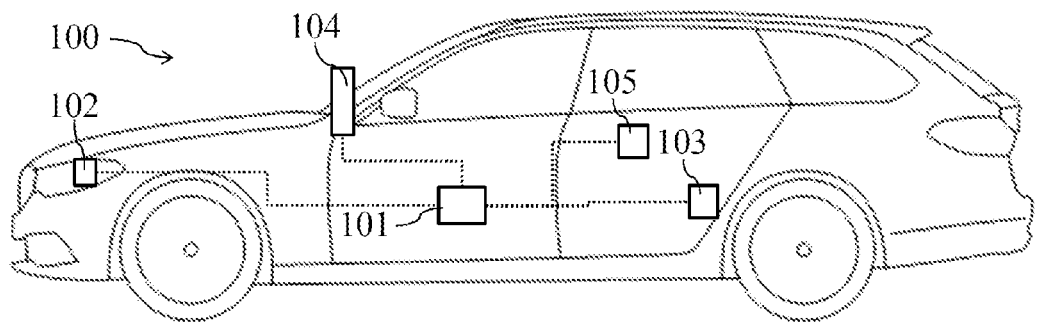
FIG. 1 shows illustrative components of a vehicle.

As explained at the outset, the present document is concerned with increasing convenience for a user of a vehicle when recording a travel trajectory for the repeat performance of a parking maneuver. In this connection, FIG. 1 shows an illustrative vehicle 100 having one or more environment sensors 102 (e.g. at least one camera, at least one radar sensor, at least one lidar sensor, at least one ultrasonic sensor, etc.) that are each configured to capture environmental data (i.e. sensor data) relating to the environment of the vehicle 100. A control apparatus 101 of the vehicle 100 may be configured to evaluate the environmental data in order to detect one or more objects in the environment of the vehicle 100.

The apparatus 101 may furthermore be configured to operate one or more longitudinal and/or lateral guidance actuators 103 of the vehicle 100 (e.g. a drive motor, a braking apparatus and/or a steering apparatus) in order to longitudinally and/or laterally guide the vehicle 100 in an automated manner. The one or more actuators 103 may be operated on the basis of the environmental data, in particular on the basis of the one or more detected objects.

The vehicle 100 may furthermore comprise a user interface 104 that facilitates an interaction between the user and the vehicle 100, e.g. in order to activate or deactivate a driver assistance function and/or in order to inform the user about the status of a driver assistance function. The user interface 104 may comprise one or more operator control elements and/or one or more output elements (e.g. a screen).

The vehicle 100 may have a driver assistance function that is designed to record a travel trajectory traveled along by the vehicle 100. The travel trajectory may be traveled along manually by the driver of the vehicle 100 and/or in an automated manner by the vehicle 100. Trajectory data relating to the travel trajectory may be stored in a storage unit 105 of the vehicle 100. For a multiplicity of positions along the travel trajectory, the trajectory data may in each case indicate coordinates of the respective position (e.g. relative to a world coordinate system and/or relative to a coordinate system of the vehicle 100);

the orientation and/or alignment of the vehicle 100 at the respective position; and/or the speed of travel of the vehicle 100 at the respective position.

The recording of a travel trajectory may be started and/or stopped explicitly by the user of the vehicle 100 (via the user interface 104). As such, the starting position and/or the final position in the stored travel trajectory may be defined in a precise manner.

Figure 2:
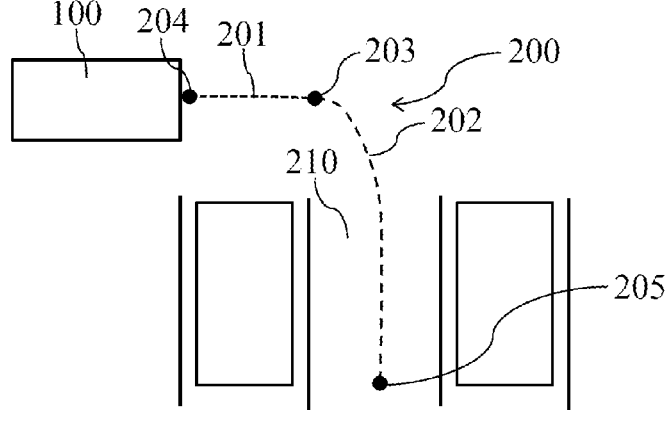
FIG. 2 shows an illustrative travel trajectory for a parking maneuver.

FIG. 2 shows an illustrative driving situation in which the vehicle 100 is driven along a travel trajectory 200 onto a parking space 210. The driver of the vehicle 100 may start here the recording of the travel trajectory 200 at the starting position 204 (for example by operating an operator control element of the user interface 104). The driver may longitudinally and/or laterally guide the vehicle 100 manually. The distance covered by the vehicle may be recorded as a first section 201 of the travel trajectory 200.

Figure 3:
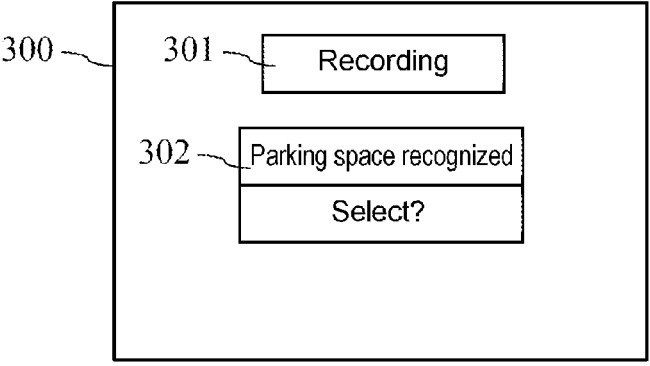
FIG. 3 shows an illustrative output from the user interface of the vehicle for the recording of a travel trajectory.

During the travel of the vehicle 100, the vehicle 100, in particular a park assist function of the vehicle 100, may (on the basis of the environmental data) recognize a parking space 210 onto which the vehicle 100 may be driven in an automated manner. The driver of the vehicle 100 may be presented with an offer, via the user interface 104, to perform the automatic parking maneuver to park the vehicle 100 on the parking space 210. This is demonstrated by way of illustration in FIG. 3. In particular, FIG. 3 shows an illustrative output 300 from the user interface 104. It may be indicated to the driver that the travel trajectory 200 is being recorded (display panel 301). Furthermore, the driver may be notified that a parking space 210 for an automatic parking maneuver has been recognized (display panel 302). In addition, the driver may be provided with the opportunity to choose to perform the automatic parking maneuver in respect of the recognized parking space 210.

In the driving situation depicted in FIG. 2, the driver initiates the performance of the automatic parking maneuver at the intermediate position 203. The vehicle 100 is then driven onto the parking space 210 in an at least partially automated manner, resulting in the second section 202 of the travel trajectory 200. The second section 202 may be recorded directly after the first section 201, and so a coherent recorded travel trajectory 200 is obtained that comprises the first section 201 (traveled along manually) and the second section 202 (traveled along in an automated manner). This coherent travel trajectory 200 may be stored in the storage unit 105 of the vehicle 100 to perform the parking maneuver again. The parking maneuver may then be performed continuously from the starting position 204 to the final position 205 on the parking space 210.

It is therefore possible for an assistance function to be provided that combines the recording of a travel trajectory (traveled along manually) with the performance and recording of an automatic parking maneuver. This allows convenience for the driver of the vehicle 100 to be increased further.

In another example of the combined use of the recording of a travel trajectory and the performance of an automatic parking maneuver, it may be recognized, during the performance of an automatic parking maneuver (e.g. to leave the parking space 210), that the user wishes to record the travel trajectory 200. By way of example, the user may be provided with the opportunity to use the user interface 104 to activate the recording of the travel trajectory 200 (traveled along as part of the parking maneuver) during the performance of the automatic parking maneuver.

The travel trajectory 200 traveled along for the automatic parking maneuver may then be recorded. Furthermore, the recording of the travel trajectory 200 may also be continued after completion of the automatic parking maneuver. The longitudinal and/or lateral guidance of the vehicle 100 may then optionally be effected manually by the driver. The recording of the travel trajectory 200 may be continued until the driver deactivates or ends the recording (using the user interface 104).

An assistance function is therefore described that involves one or more maneuver offers from the park assist system being displayed during the recording of a travel trajectory 200. The driver of the vehicle 100 may then select a maneuver offer. Accordingly, the offer to start a recording of the travel trajectory 200 of the vehicle 100 may also be output during the performance of an automatic parking maneuver.

There may also be combined output of recorded driving maneuvers and maneuver offers from the park assist system (for a replay). The user may select a maneuver from a combined list of maneuvers (e.g. parking maneuvers and/or recorded trajectories 200) in order to have the selected maneuver performed in an automated manner.

If the user terminates the performance of an automatic parking maneuver during the active recording of a travel trajectory 200, this may also lead to the recording of the travel trajectory 200 being terminated. The user of the vehicle 100 may be informed about the termination, in particular about a reason for the termination, by way of output of a notification.

During the active recording of a travel trajectory 200, the user interface 104 may be used to indicate to the user which of the possible automatic parking maneuvers is being started and/or performed.

As explained earlier, when recording of a travel trajectory 200 is active, the user of the vehicle 100 may select a parking maneuver for automatic performance. This may lead to an intermediate phase at the intermediate position 203 in which the vehicle 100 is stationary. The combined travel trajectory 200 may be compiled from the first section 201 and the second section 202 such that the standstill and/or intermediate phase at the intermediate position 203 is shortened, preferably eliminated, compared with the recording. It is therefore possible to effect a fresh travel along the travel trajectory 200 without or with reduced interruption at the intermediate position 203. The combined travel trajectory 200 may preferably be stored, and used for a fresh travel, such that the transition between the manual travel and the performance of the parking maneuver is not discernible by the user.

In one example, the user starts the recording of a travel trajectory 200. During the travel, a parking offer may be displayed (e.g. after passing a parking space 210) that may be selected by the user. The maneuver is then performed (without terminating the recording of the travel trajectory 200). Furthermore, the recording of the travel trajectory 200 may optionally be ended automatically when the final parked position 205 of the vehicle 100 is reached. A combined travel trajectory 200 may then be stored, which may be used for a fresh automated travel of the vehicle 100 (without interruption from the starting position 204 to the final position 205).

FIG. 4A shows a flowchart for a (optionally computer-implemented) method 400 for recording a travel trajectory 200 for a parking maneuver by a (motor) vehicle 100. The method 400 comprises recording 401, during a travel of the vehicle 100, a first section 201 of the travel trajectory 200. During the travel along the first section 201, the longitudinal and/or the lateral guidance of the vehicle 100 may be effected manually by the driver of the vehicle 100.

The method 400 furthermore comprises recognizing 402, during the travel of the vehicle 100, that an automatic parking maneuver needs to be performed. A park assist function of the vehicle 100 may have recognized a parking space 210 here. Furthermore, the user interface 104 may have been used to output an offer to perform an automatic parking maneuver onto the recognized parking space 210 and for acceptance of said offer by the driver (during the recording of the travel trajectory 200).

In addition, the method 400 comprises recording 403, during the performance of the automatic parking maneuver as a continuation of the travel of the vehicle 100, a second section 202 of the travel trajectory 200. During the travel along the second section 202, the longitudinal and/or the lateral guidance may be effected in an automated manner by the vehicle 100.

A combined travel trajectory 200 may therefore be recorded and stored that comprises a first section 201 (traveled along manually) and a directly subsequent second section 202 (traveled along in an automated manner). The combined travel trajectory 200 may be used in a subsequent replay to perform the parking maneuver along the whole travel trajectory 200 in an automated manner (with automated longitudinal and/or lateral guidance).

FIG. 4B shows a flowchart for a further (optionally computer-implemented) method 410 for recording a travel trajectory 200 for a parking maneuver by a (motor) vehicle 100. The features of the two methods 400, 410 are each individually combinable with one another (and with the respectively other method 400, 410).

The method 410 comprises recognizing 411, during a performance of an automatic parking maneuver (in which the vehicle 100 is longitudinally and/or laterally guided in an automated manner), that a travel trajectory 200 effected for the parking maneuver needs to be recorded. This may be recognized e.g. on the basis of a user input from the driver of the vehicle 100 on the user interface 104.

The method 410 furthermore comprises responding to the recognition 411 by having 412 the travel trajectory 200 recorded. The recording may extend over the whole (remaining) period of the automatic parking maneuver and may optionally go beyond the final position in the automatic parking maneuver (e.g. until the recording is stopped by the user of the vehicle 100). The recorded travel trajectory 200 may optionally also comprise here one or more sections 201 that (following the automatic parking maneuver or before the start of the automatic parking maneuver) have been traveled along manually by the driver of the vehicle 100. The recorded trajectory 200 may be provided for a subsequent replay of the travel trajectory 200.

The aspects described in this document can be used to efficiently and reliably increase convenience for a user when recording and/or performing a parking maneuver.

The present invention is not limited to the exemplary embodiments shown. In particular, it should be noted that the description and the figures are intended to demonstrate the principle of the proposed methods, apparatuses and systems merely by way of illustration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for recording a travel trajectory for a parking maneuver by a vehicle, comprising:

a control apparatus operatively configured to:

record, during a travel of the vehicle, a first section of the travel trajectory, in which longitudinal and/or lateral guidance of the vehicle is effected manually by a driver of the vehicle;

recognize, during the travel of the vehicle, that an automatic parking maneuver needs to be performed; and record, during the performance of the automatic parking maneuver as a continuation of the travel of the vehicle, a second section of the travel trajectory, in which the longitudinal and/or the lateral guidance is effected in an automated manner by the vehicle, wherein the control apparatus is further configured to:

recognize that, at an intermediate position between the first section and the second section of the travel trajectory, the travel of the vehicle has an intermediate phase in which a speed of travel of the vehicle is the same as or below a speed threshold value; and shorten the timing of the intermediate phase within the travel trajectory to store the travel trajectory.

2. The apparatus according to claim 1, wherein the control apparatus is further configured to:

recognize, at an intermediate position on the travel trajectory, that an automatic parking maneuver needs to be performed; and record the first section of the travel trajectory up to the intermediate position and the second section of the travel trajectory from the intermediate position.

3. The apparatus according to claim 1, wherein the control apparatus is further configured to:

use, at a final position in the travel of the vehicle, a user interface of the vehicle to output an offer to store the travel trajectory; and store the travel trajectory in a storage unit of the vehicle in response to a user input in relation to the offer.

4. The apparatus according to claim 1, wherein the control apparatus is further configured to:

use, during the travel of the vehicle, a user interface of the vehicle to output an offer to perform the automatic parking maneuver; and respond to a user input in relation to the offer by recognizing that the automatic parking maneuver needs to be performed.

5. The apparatus according to claim 1, wherein the control apparatus is further configured to:

take, during the travel of the vehicle, environmental data from one or more environment sensors of the vehicle as a basis for detecting a parking space for the vehicle; and respond to the detected parking space by using a user interface of the vehicle to output an offer to perform an automatic parking maneuver into the detected parking space.

6. The apparatus according to claim 1, wherein the speed threshold value is zero, and the intermediate phase timing is eliminated.

7. The apparatus according to claim 1, wherein the control apparatus is further configured to:

store the recorded travel trajectory for a subsequent use, when the parking maneuver is repeated, such that:

the stored travel trajectory comprises a steady and/or smooth transition at an intermediate position between the first section and the second section; and/or the stored travel trajectory does not comprise a standstill by the vehicle at the intermediate position between the first section and the second section; and/or the stored travel trajectory is continuous and/or uninterrupted from a starting position at a start of the first section to a final position at an end of the second section.

8. The apparatus according to claim 1, wherein the control apparatus is further configured to:

start the recording of the first section of the travel trajectory in response to a user input on a user interface of the vehicle; and/or end the recording of the second section of the travel trajectory in response to a user input on the user interface of the vehicle and/or automatically when a final position in the automatic parking maneuver is reached.

9. The apparatus according to claim 1, wherein the control apparatus is further configured to:

use, in a replay mode, a user interface of the vehicle to output an offer to use the recorded travel trajectory stored in a storage unit of the vehicle for a repeat performance of the parking maneuver; and respond to a user input in relation to the offer by having the parking maneuver performed in an automated manner on the basis of the travel trajectory.

10. A method for recording a travel trajectory for a parking maneuver by a vehicle, the method comprising:

recording, during a travel of the vehicle, a first section of the travel trajectory, in which longitudinal and/or lateral guidance of the vehicle is effected manually by a driver of the vehicle;

recognizing, during the travel of the vehicle, that an automatic parking maneuver needs to be performed; and recording, during the performance of the automatic parking maneuver as a continuation of the travel of the vehicle, a second section of the travel trajectory, in which the longitudinal and/or the lateral guidance is effected in an automated manner by the vehicle; and the method further comprising:

recognizing that, at an intermediate position between the first section and the second section of the travel trajectory, the travel of the vehicle has an intermediate phase in which a speed of travel of the vehicle is the same as or below a speed threshold value; and shortening the timing of the intermediate phase within the travel trajectory to store the travel trajectory.

\* \* \* \* \*